(12) United States Patent
Park et al.

(10) Patent No.: US 11,788,778 B2
(45) Date of Patent: Oct. 17, 2023

(54) GEOTHERMAL HEAT SYSTEM HAVING REDUCED HEAT SOURCE RESIDUAL HEAT OF GEOTHERMAL HEAT PUMP

(71) Applicant: J&G CORP., Jeollabuk-do (KR)

(72) Inventors: Jong Woo Park, Jeollabuk-do (KR); Jeong Soo Shin, Gyeonggi-do (KR); Jin Yong Kim, Jeollabuk-do (KR)

(73) Assignee: J&G CORP., Jeollabuk-Do (KR)

( * ) Notice: Subject to any disclaimer, the term of this patent is extended or adjusted under 35 U.S.C. 154(b) by 85 days.

(21) Appl. No.: 17/537,489

(22) Filed: Nov. 30, 2021

(65) Prior Publication Data

US 2022/0307738 A1 Sep. 29, 2022

(30) Foreign Application Priority Data

Mar. 29, 2021 (KR) .......................... 10-2021-0040562

(51) Int. Cl.
*F25B 30/06* (2006.01)
*F24T 10/10* (2018.01)
*F25B 41/20* (2021.01)
*F24T 10/00* (2018.01)

(52) U.S. Cl.
CPC .............. *F25B 30/06* (2013.01); *F24T 10/10* (2018.05); *F25B 41/20* (2021.01); *F24T 2010/50* (2018.05); *F25B 2313/002* (2013.01)

(58) Field of Classification Search
CPC .... F25B 2313/002; F25B 30/06; F25B 41/20; F28D 20/0034; F24T 10/10; F24T 2010/50; F24T 50/00; Y02E 10/10; Y02E 60/14; Y02E 70/30
See application file for complete search history.

(56) References Cited

FOREIGN PATENT DOCUMENTS

| KR | 10-0620907 | 8/2006 |
| KR | 101316691 B1 * | 10/2013 |
| KR | 20200044499 A * | 4/2020 |

* cited by examiner

*Primary Examiner* — Kun Kai Ma
(74) *Attorney, Agent, or Firm* — Ladas & Parry, LLP

(57) ABSTRACT

Provided is a geothermal heat system having reduced heat source residual heat of a geothermal heat pump. The geothermal heat system includes a ground heat exchanger unit, a geothermal heat pump, and a residual heat storage tank. A portion of heat source residual heat remaining in the geothermal heat pump is transferred on a geothermal heat exchange medium passing through the geothermal heat pump so as to be stored in the residual heat storage tank. As the internal temperature of the residual heat storage tank gradually becomes the same as the temperature of the underground, the thermal load of the underground is removed. At least a portion of the heat source residual heat produced during provision of cooling/heating to the location of use is processed, thereby improving the operating efficiency of the geothermal heat system having reduced heat source residual heat of a geothermal heat pump.

11 Claims, 10 Drawing Sheets

GEOTHERMAL HEAT SYSTEM HAVING REDUCED HEAT SOURCE RESIDUAL HEAT OF GEOTHERMAL HEAT PUMP

CROSS REFERENCE TO RELATED APPLICATION

This application claims priority from Korean Patent Application No. 10-2021-0040562, filed on Mar. 29, 2021, which is hereby incorporated by reference for all purposes as if fully set forth herein.

BACKGROUND

Field

The present disclosure relates to a geothermal heat system having reduced heat source residual heat of a geothermal heat pump.

Description

A geothermal heat pump is a system for providing cooling/heating to a location of use (i.e., a place where cooling/heating is required) through heat exchange with the underground. In general, the geothermal heat pump includes a compressor, a condenser, an expansion valve, and an evaporator. A patent document that may be proposed as an example of such a geothermal heat pump will be discussed below.

A typical geothermal heat pump of the related art is operated to provide cooling to a location of use by absorbing heat therefrom and moving the absorbed heat to the underground in the summer and provide heating to the location of use by absorbing heat from the underground in the winter.

However, according to the geothermal heat pump of the related art, warm residual heat having a relatively high temperature is produced as the geothermal heat pump provides cooling to the location of use, and cold residual heat having a relatively low temperature is produced as the geothermal heat pump provides heating to the location of use. Here, heat source residual heat, i.e., a concept including warm residual heat and cold residual heat, is directly moved to the underground, and thus, acts as operating load on both the geothermal heat pump repeatedly turned on and off depending on the temperature of the location of use and the underground. Consequently, such heat source residual heat causes a decrease in the operating efficiency of the entire system including the geothermal heat pump.

The information disclosed in the Background section is only provided for a better understanding of the background and should not be taken as an acknowledgment or any form of suggestion that this information forms prior art that would already be known to a person having ordinary skill in the art.

RELATED ART DOCUMENT

Patent Document 1: Korean Patent No. 10-0620907 (Aug. 30, 2006; titled "GEOTHERMAL HEAT COLLECTOR AND HEAT PUMP TYPE COOLING APPARATUS USING THE SAME")

BRIEF SUMMARY

Various aspects of the present disclosure provide a geothermal heat system having reduced heat source residual heat of a geothermal heat pump, the geothermal heat system being configured to process at least a portion of heat source residual heat produced as the geothermal heat pump provides cooling/heating to a location of use, thereby improving operating efficiency.

According to an aspect, a geothermal heat system having reduced heat source residual heat of a geothermal heat pump may include: a ground heat exchanger unit allowing a geothermal heat exchange medium to exchange heat with the underground; a geothermal heat pump allowing the geothermal heat exchange medium, which has exchanged heat with the underground while passing through the ground heat exchanger unit, to exchange heat with a coolant while passing through the geothermal heat pump so as to provide cooling/heating to a location of use; and a residual heat storage tank connected to a path connected in series, through which the geothermal heat exchange medium flows from the geothermal heat pump to the ground heat exchanger unit, to store a portion of heat source residual heat therein, thereby reducing an operating load of at least one of the underground and the geothermal heat pump, wherein the heat source residual heat includes warm residual heat produced as the geothermal heat pump provides cooling to the location of use and remaining inside the geothermal heat pump and in the geothermal heat exchange medium and cold residual heat produced as the geothermal heat pump provides heating to the location of use and remaining inside the geothermal heat pump and in the geothermal heat exchange medium.

According to another aspect, a geothermal heat system having reduced heat source residual heat of a geothermal heat pump may include: a ground heat exchanger unit allowing a geothermal heat exchange medium to exchange heat with the underground; a geothermal heat pump allowing the geothermal heat exchange medium, which has exchanged heat with the underground while passing through the ground heat exchanger unit, to exchange heat with a coolant while passing through the geothermal heat pump so as to provide cooling/heating to a location of use; and a residual heat storage tank storing a portion of heat source residual heat to reduce an operating load of at least one of the underground and the geothermal heat pump, wherein the heat source residual heat includes warm residual heat produced as the geothermal heat pump provides cooling to the location of use and remaining inside the geothermal heat pump and in the geothermal heat exchange medium and cold residual heat produced as the geothermal heat pump provides heating to the location of use and remaining inside the geothermal heat pump and in the geothermal heat exchange medium.

Portions of the geothermal heat exchange medium may be sprayed as counterflows from an inner upper portion and an inner lower portion of the residual heat storage tank toward a central portion of the residual heat storage tank to collide with each other in the central portion of the residual heat storage tank, and then, the geothermal heat exchange medium may be discharged through an outlet provided in the central portion of the residual heat storage tank to move toward the underground, so that an amount of heat exchange in the residual heat storage tank is increased.

The geothermal heat system having reduced heat source residual heat of a geothermal heat pump according to an aspect of the present disclosure includes the ground heat exchanger unit, the geothermal heat pump, and the residual heat storage tank. Thus, a portion of the heat source residual heat remaining in the geothermal heat pump is transferred on the geothermal heat exchange medium passing through the geothermal heat pump so as to be stored in the residual heat storage tank. As the internal temperature of the residual heat storage tank gradually becomes the same as the temperature of the underground, the thermal load of the underground is removed. Consequently, at least a portion of the heat source residual heat produced during provision of cooling/heating to the location of use by the geothermal heat pump can be processed, thereby improving the operating efficiency of the geothermal heat system having reduced heat source residual heat of a geothermal heat pump.

DESCRIPTION OF DRAWINGS

The above and other objectives, features, and advantages of the present disclosure will be more clearly understood from the following detailed description, taken in conjunction with the accompanying drawings, in which.

DETAILED DESCRIPTION

Hereinafter, a geothermal heat system having reduced heat source residual heat of a geothermal heat pump according to embodiments of the present disclosure will be described with reference to the accompanying drawings.

Figure 1:
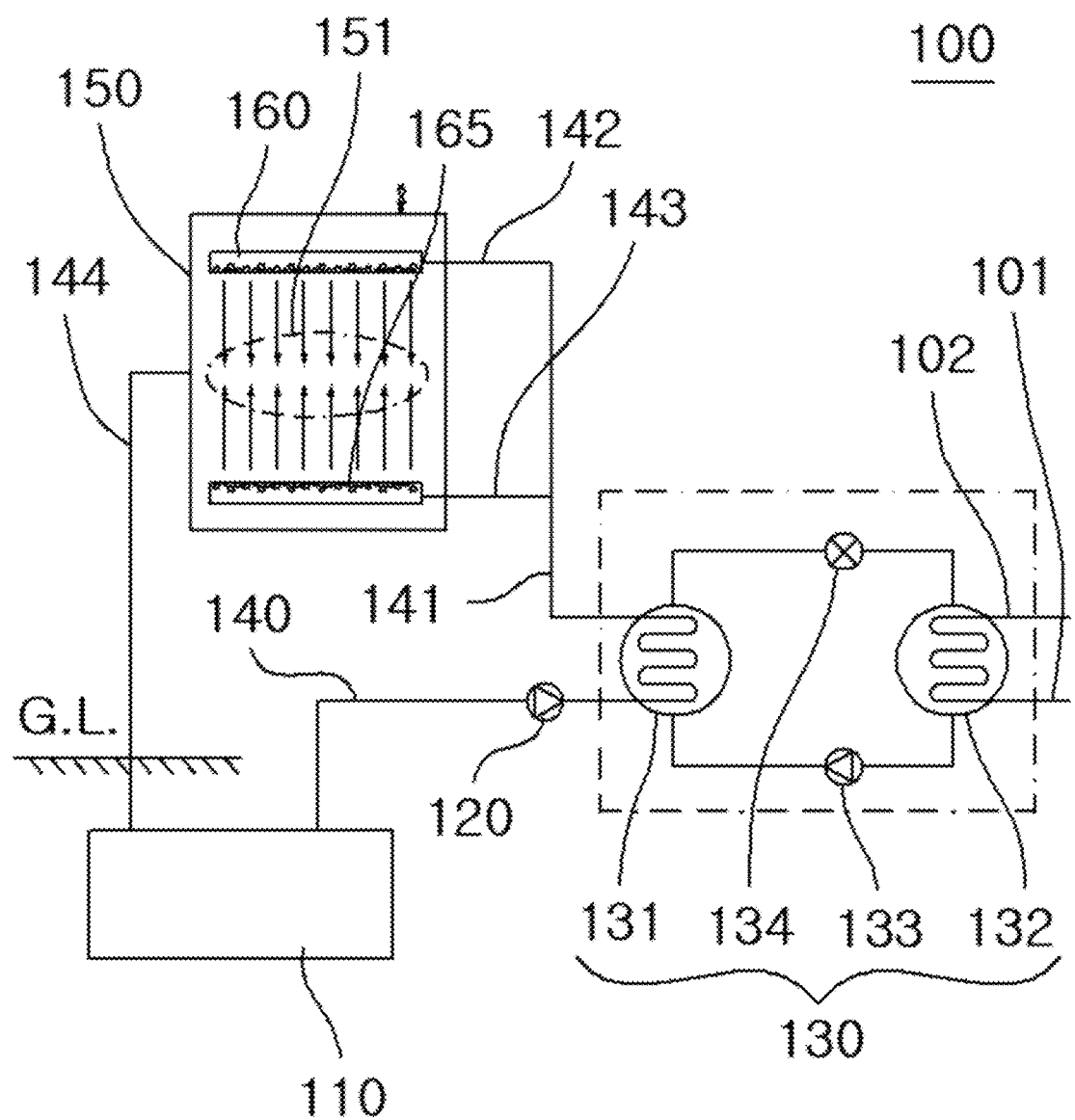
FIG. 1 is a schematic diagram illustrating the configuration of a geothermal heat system having reduced heat source residual heat of a geothermal heat pump according to a first embodiment of the present disclosure.
Figure 2:
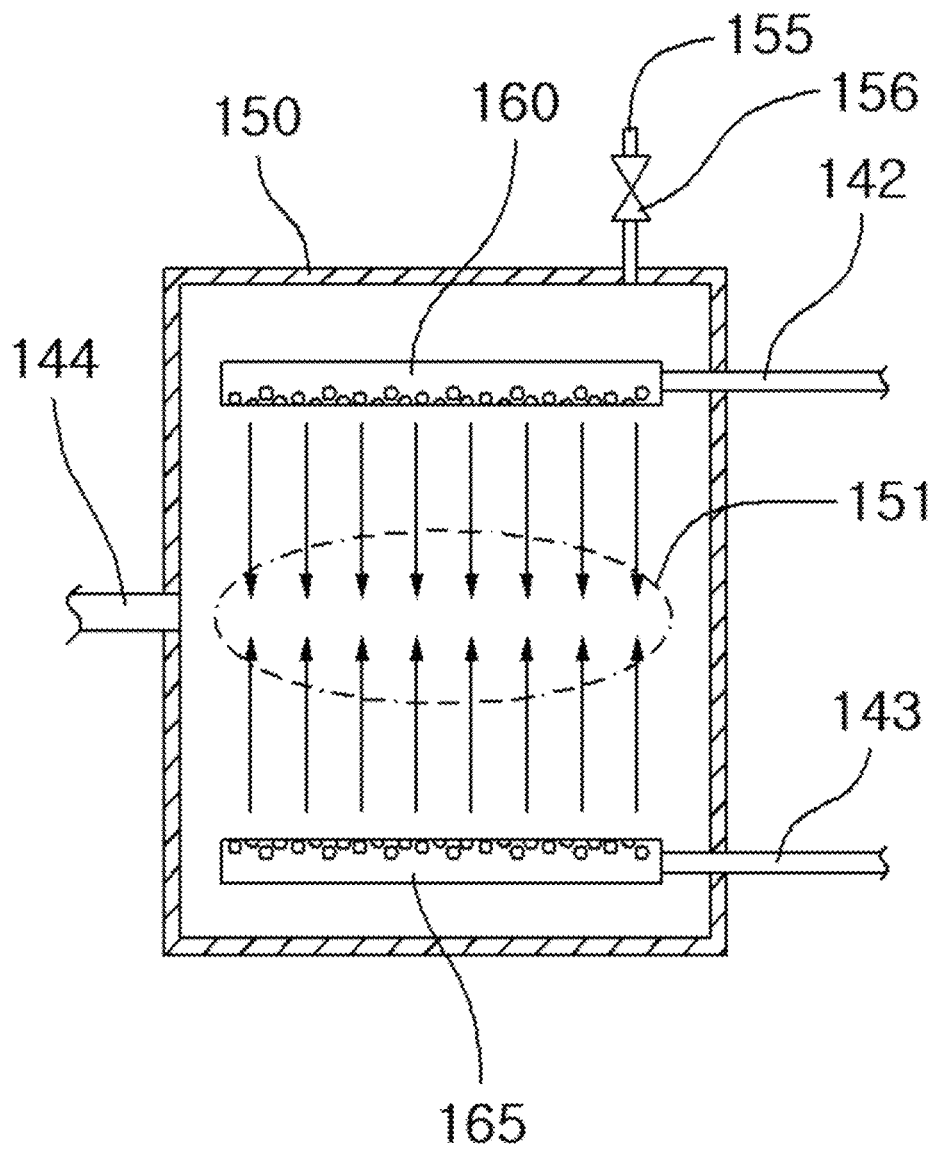
FIG. 2 is a vertical cross-sectional diagram illustrating the internal configuration of the residual heat storage tank of the geothermal heat system having reduced heat source residual heat of a geothermal heat pump according to the first embodiment of the present disclosure.
Figure 3:
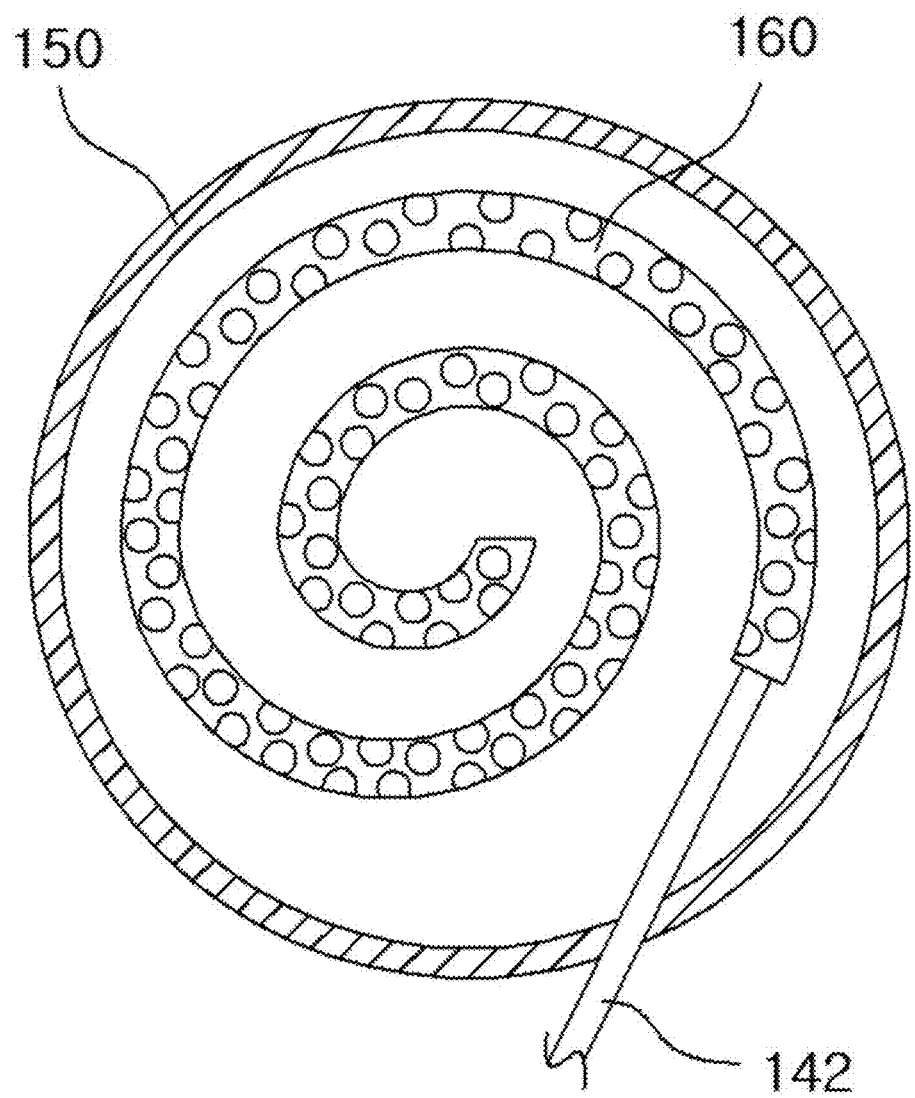
FIG. 3 is a horizontal cross-sectional diagram illustrating the internal configuration of the residual heat storage tank of the geothermal heat system having reduced heat source residual heat of a geothermal heat pump according to the first embodiment of the present disclosure.

FIG. 1 is a schematic diagram illustrating the configuration of a geothermal heat system having reduced heat source residual heat of a geothermal heat pump according to a first embodiment of the present disclosure, FIG. 2 is a vertical cross-sectional diagram illustrating the internal configuration of a residual heat storage tank of the geothermal heat system having reduced heat source residual heat of a geothermal heat pump according to the first embodiment of the present disclosure, and FIG. 3 is a horizontal cross-sectional diagram illustrating the internal configuration of the residual heat storage tank of the geothermal heat system having reduced heat source residual heat of a geothermal heat pump according to the first embodiment of the present disclosure.

Referring to FIGS. 1 to 3, a geothermal heat system 100 having reduced heat source residual heat of a geothermal heat pump according to the present embodiment includes a ground heat exchanger unit 110, a geothermal heat pump 130, and a residual heat storage tank 150.

In addition, the geothermal heat system 100 having reduced heat source residual heat of a geothermal heat pump further includes a geothermal heat source pump 120, a tank-direction main pipe (i.e., a pipe extending in the direction of the tank) 141, a tank-direction first branch pipe 142, a tank-direction second branch pipe 143, a tank top spray nozzle 160, a tank bottom spray nozzle 165.

The ground heat exchanger unit 110 allows a geothermal heat exchange medium to exchange heat with the underground. A typical underground heat exchange pipe may be taken as an example of the ground heat exchanger unit 110. The ground heat exchanger unit 110 may be any of an open type, a closed type, a water heat source type, and a sea water heat source type.

The geothermal heat exchange medium may be water.

A geothermal heat supply pipe 140 and a geothermal heat recovery pipe 144 are connected to the ground heat exchanger unit 110. The geothermal heat supply pipe 140 allows the geothermal heat exchange medium to flow therethrough so as to be discharged from the geothermal heat supply pipe 140. The geothermal heat recovery pipe 144 allows the geothermal heat exchange medium to flow therethrough so as to be recovered to the ground heat exchanger unit 110.

The geothermal heat pump 130 allows the geothermal heat exchange medium, which has exchanged heat with the underground while passing through the ground heat exchanger unit 110, to exchange heat with a coolant while passing through the geothermal heat pump 130 so as to provide cooling/heating to a location of use.

The geothermal heat pump 130 includes a heat source-side heat exchanger 131 and a load-side heat exchanger 133 disposed within a pump housing.

Inside the pump housing of the geothermal heat pump 130, a compressor 133 and an expansion valve 134 are further provided. The compressor 133, the heat source-side heat exchanger 131, the expansion valve 134, and the load-side heat exchanger 133 form a refrigeration cycle, and the coolant circulates through the compressor 133, the heat source-side heat exchanger 131, the expansion valve 134, and the load-side heat exchanger 133. For conversion between cooling and heating to the location of use, the direction of circulation of the coolant inside the geothermal heat pump 130 may be reversed.

When cooling is provided to the location of use, the heat source-side heat exchanger 131 may serve as a condenser, and the load-side heat exchanger 133 may serve as an evaporator. When heating is provided to the location of use, the heat source-side heat exchanger 131 may serve as an evaporator, and the load-side heat exchanger 133 may serve as a condenser. This operation of the geothermal heat pump 130 is the same as the operation of a typical heat pump, and thus, a detailed description thereof will be omitted herein.

Reference numerals 101 and 102 indicate use-side circulation pipes connecting the load-side heat exchanger 133 to the location of use. Cooling/heating may be provided to the location of use using a cooling-heating circulation medium, such as water, circulating between the use-side circulation pipes 101 and 102 and the load-side heat exchanger 133.

The residual heat storage tank 150 is connected to a path connected in series, through which the geothermal heat exchange medium flows from the geothermal heat pump 130 to the ground heat exchanger unit 110, to store a portion of heat source residual heat therein. In this manner, the operating load of at least one of the underground and the geothermal heat pump 130 may be reduced.

Here, the heat source residual heat includes warm residual heat produced as the geothermal heat pump 130 provides cooling to the location of use and remaining inside the geothermal heat pump 130 and in the geothermal heat exchange medium and cold residual heat produced as the geothermal heat pump 130 provides heating to the location of use and remaining inside the geothermal heat pump 130 and in the geothermal heat exchange medium.

The geothermal heat source pump 120 may move the geothermal heat exchange medium from the ground heat exchanger unit 110 toward the geothermal heat pump 130. The geothermal heat source pump 120 may be disposed on the geothermal heat supply pipe 140.

The tank-direction main pipe 141 extends from the heat source-side heat exchanger 131 of the geothermal heat pump 130 toward the residual heat storage tank 150, and allows the geothermal heat exchange medium, which has passed through the geothermal heat pump 130, to flow toward the residual heat storage tank 150.

The tank-direction first branch pipe 142 is branched from the tank-direction main pipe 141 and connected to the upper portion of the residual heat storage tank 150.

The tank-direction second branch pipe 143 is branched from the tank-direction main pipe 141 and connected to the lower portion of the residual heat storage tank 150.

The tank-direction first branch pipe 142 and the tank-direction second branch pipe 143 are branched from the tank-direction main pipe 141 and connected to the upper portion and the lower portion of the residual heat storage tank 150, respectively. Thus, the geothermal heat exchange medium having flowed through the tank-direction main pipe 141 is divided and flows through the tank-direction first branch pipe 142 and the tank-direction second branch pipe 143 and then enters the upper portion and the lower portion of the residual heat storage tank 150.

The tank top spray nozzle 160 is disposed in the inner upper portion of the residual heat storage tank 150 and communicates with the tank-direction first branch pipe 142. The tank top spray nozzle 160 may spray a portion of the geothermal heat exchange medium, which has flowed through the tank-direction first branch pipe 142, from the inner upper portion of the residual heat storage tank 150 toward the central portion of the residual heat storage tank 150.

The tank bottom spray nozzle 165 is disposed in the inner lower portion of the residual heat storage tank 150 and communicates with the tank-direction second branch pipe 143. The tank bottom spray nozzle 165 may spray a portion of the geothermal heat exchange medium, which has flowed through the tank-direction second branch pipe 143, from the inner lower portion of the residual heat storage tank 150 toward the central portion of the residual heat storage tank 150.

The tank top spray nozzle 160 is oriented downward toward the central portion of the residual heat storage tank 150, whereas the tank bottom spray nozzle 165 is oriented upward toward the central portion of the residual heat storage tank 150.

The portions of the geothermal heat exchange medium sprayed through the tank top spray nozzle 160 and the tank bottom spray nozzle 165, respectively, collide with each other in the central portion of the residual heat storage tank 150, thereby forming a collision zone 151 in the central portion of the residual heat storage tank 150. Thus, the amount of heat exchange in the collision zone 151 may be increased.

As illustrated in FIG. 3, in the present embodiment, the tank top spray nozzle 160 is provided in the shape of a spring wound several times, with a plurality of nozzle holes being provided in the bottom portion.

Although not shown in detail, the tank bottom spray nozzle 165 is also provided in the shape of a spring wound several times like the tank top spray nozzle 160, and has a plurality of nozzle holes in the top portion.

In the present embodiment, in order to increase the amount of heat exchange in the residual heat storage tank 150, the portions of the geothermal heat exchange medium are sprayed as counterflows from the inner upper portion and the inner lower portion of the residual heat storage tank 150 toward the central portion of the residual heat storage tank 150 to collide with each other in the central portion of the residual heat storage tank 150, and then, the geothermal heat exchange medium is discharged through an outlet provided in the central portion of the residual heat storage tank 150 to move toward the underground.

As the portions of the geothermal heat exchange medium collide with each other in the collision zone 151, the internal pressure of the collision zone 151 of the residual heat storage tank 150 is higher than the others. Consequently, the geothermal heat exchange medium may be easily discharged through the outlet provided in the collision zone 151, the internal pressure of which is relatively increased.

In addition, the geothermal heat system 100 having reduced heat source residual heat of a geothermal heat pump may further include a breather valve 156.

The breather valve 156 is provided on the upper portion of the residual heat storage tank 150 and configured to automatically discharge gas vapor through the upper portion of the residual heat storage tank 150, wherein the gas vapor is produced as the portions of the geothermal heat exchange medium sprayed as counterflows from the inner upper portion and inner lower portion of the residual heat storage tank 150 toward the central portion of the residual heat storage tank 150 collide with each other in the collision zone 151 of the central portion of the residual heat storage tank 150.

The breather valve 156 is presented in the form of a check valve allowing fluid to only move from the inside to the outside of the residual heat storage tank 150.

A vapor discharge pipe 155 communicating with the outside is provided on the upper portion of the residual heat storage tank 150. The breather valve 156 is disposed on the vapor discharge pipe 155. When the pressure of gas vapor produced in the collision zone 151 is equal to or higher than a predetermined pressure, the breather valve 156 is opened, thereby allowing the gas vapor produced in the collision zone 151 to be discharged to the outside through the vapor discharge pipe 155.

In the present embodiment, even in the case that the temperature of the location of use reaches a set temperature or a target temperature during cooling/heating of the location of use and thus the operation of the geothermal heat pump 130 is stopped, the geothermal heat source pump 120 continues running. Consequently, a portion of the heat source residual heat remaining in the geothermal heat pump 130 is transferred on the geothermal heat exchange medium passing through the geothermal heat pump 130 so as to be stored in the residual heat storage tank 150. As the internal temperature of the residual heat storage tank 150 gradually becomes the same as the temperature of the underground, the thermal load of the underground is removed. Consequently, when the geothermal heat pump 130 is restarted, the operating load of the geothermal heat pump 130 may be reduced.

Here, the set temperature is a temperature set by a controller for cooling/heating of the location of use, and the target temperature is a temperature serving as a target for a temperature value directly measured from the location of use by a temperature sensor or the like.

In addition, before the geothermal heat pump 130 is started to provide cooling/heating to the location of use, the geothermal heat source pump 120 is started. Then, the geothermal heat exchange medium circulates through the ground heat exchanger unit 110 and the residual heat storage tank 150, thereby causing the internal temperature of the residual heat storage tank 150 to be substantially the same as the temperature of the underground. Consequently, when the geothermal heat pump 130 is started to provide cooling/heating to the location of use, the operating load of the geothermal heat pump 130 may be reduced.

Hereinafter, operations of the geothermal heat system 100 having reduced heat source residual heat of a geothermal heat pump according to the present embodiment will be described with reference to the drawings.

First, before the geothermal heat pump 130 is started to provide cooling/heating to the location of use, when the geothermal heat source pump 120 is started, the geothermal heat exchange medium having exchanged heat with the underground in the ground heat exchanger unit 110 passes through the heat source-side heat exchanger 131 of the geothermal heat pump 130 through the geothermal heat supply pipe 140 (wherein heat exchange is not performed in the heat source-side heat exchanger 131). Afterwards, the geothermal heat exchange medium flows through the tank-direction main pipe 141 and is branched through the tank-direction first branch pipe 142 and the tank-direction second branch pipe 143. Consequently, the branched portions of the geothermal heat exchange medium enter the upper portion and the lower portion of the residual heat storage tank 150, respectively.

The branched portions of the geothermal heat exchange medium that have entered the upper and lower portions of the residual heat storage tank 150 are sprayed through the tank top spray nozzle 160 and the tank bottom spray nozzle 165, respectively, to collide with each other in the collision zone 151 in the central portion of the residual heat storage tank 150, thereby exchanging heat with a portion of the geothermal heat exchange medium having been stored in the residual heat storage tank 150.

Here, since the pressure of the collision zone 151 in the central portion of the residual heat storage tank 150 is higher than the others, a portion of the geothermal heat exchange medium having been stored in the residual heat storage tank 150, adjacent to the outlet, is discharged through the outlet, flows through the geothermal heat recovery pipe 144, and then, returns to the ground heat exchanger unit 110.

Through this circulation process, the internal temperature of the residual heat storage tank 150 becomes the same as the temperature of the underground. When the geothermal heat pump 130 is started to provide cooling/heating to the location of use, the operating load of the geothermal heat pump 130 may be reduced.

Afterwards, when the geothermal heat pump 130 is started to provide cooling/heating to the location of use, the geothermal heat exchange medium moved to the heat source-side heat exchanger 131 by the geothermal heat source pump 120 that is already running may exchange heat with the coolant circulating inside the geothermal heat pump 130, and the coolant may exchange heat with the cooling/heating circulation medium circulating through the load-side heat exchanger 133 and the location of use. Consequently, cooling/heating may be provided to the location of use.

The geothermal heat exchange medium having exchanged heat with the coolant while passing through the heat source-side heat exchanger 131 flows through the tank-direction main pipe 141 and is branched into the tank-direction first branch pipe 142 and the tank-direction second branch pipe 143. Consequently, the branched portions of the geothermal heat exchange medium enter the upper portion and the lower portion of the residual heat storage tank 150, respectively.

The branched portions of the geothermal heat exchange medium that have entered the upper and lower portions of the residual heat storage tank 150 are sprayed through the tank top spray nozzle 160 and the tank bottom spray nozzle 165, respectively, to collide with each other in the collision zone 151 in the central portion of the residual heat storage tank 150, thereby exchanging heat with a portion of the geothermal heat exchange medium having been stored in the residual heat storage tank 150.

Here, since the pressure of the collision zone 151 in the central portion of the residual heat storage tank 150 is higher than the others, a portion of the geothermal heat exchange medium having been stored in the residual heat storage tank 150, adjacent to the outlet, is discharged through the outlet, flows through the geothermal heat recovery pipe 144, and then, returns to the ground heat exchanger unit 110.

In addition, in this circulation process, even in the case that the temperature of the location of use reaches the set temperature or the target temperature during cooling/heating of the location of use and thus the geothermal heat pump 130 is stopped, the geothermal heat source pump 120 continues running, thereby allowing the geothermal heat exchange medium to continuously circulate. Consequently, a portion of the heat source residual heat remaining in the geothermal heat pump 130 is transferred on the geothermal heat exchange medium passing through the geothermal heat pump 130 so as to be stored in the residual heat storage tank 150. As the internal temperature of the residual heat storage tank 150 gradually becomes the same as the temperature of the underground, the thermal load of the underground is removed. Consequently, when the geothermal heat pump 130 is restarted, the operating load of the geothermal heat pump 130 may be reduced.

As set forth above, the geothermal heat system 100 having reduced heat source residual heat of a geothermal heat pump includes the ground heat exchanger unit 110, the geothermal heat pump 130, and the residual heat storage tank 150. Thus, a portion of the heat source residual heat remaining in the geothermal heat pump 130 is transferred on the geothermal heat exchange medium passing through the geothermal heat pump 130 so as to be stored in the residual heat storage tank 150. As the internal temperature of the residual heat storage tank 150 gradually becomes the same as the temperature of the underground, the thermal load of the underground is removed. Consequently, at least a portion of the heat source residual heat produced during provision of cooling/heating to the location of use by the geothermal heat pump 130 may be processed, thereby improving the operating efficiency of the geothermal heat system 100 having reduced heat source residual heat of a geothermal heat pump.

Hereinafter, a geothermal heat system having reduced heat source residual heat of a geothermal heat pump according to another embodiment of the present disclosure will be described with reference to the accompanying drawings. In the following, descriptions of some features will be omitted when they are identical to those of the above-described embodiment of the present disclosure.

Figure 4:
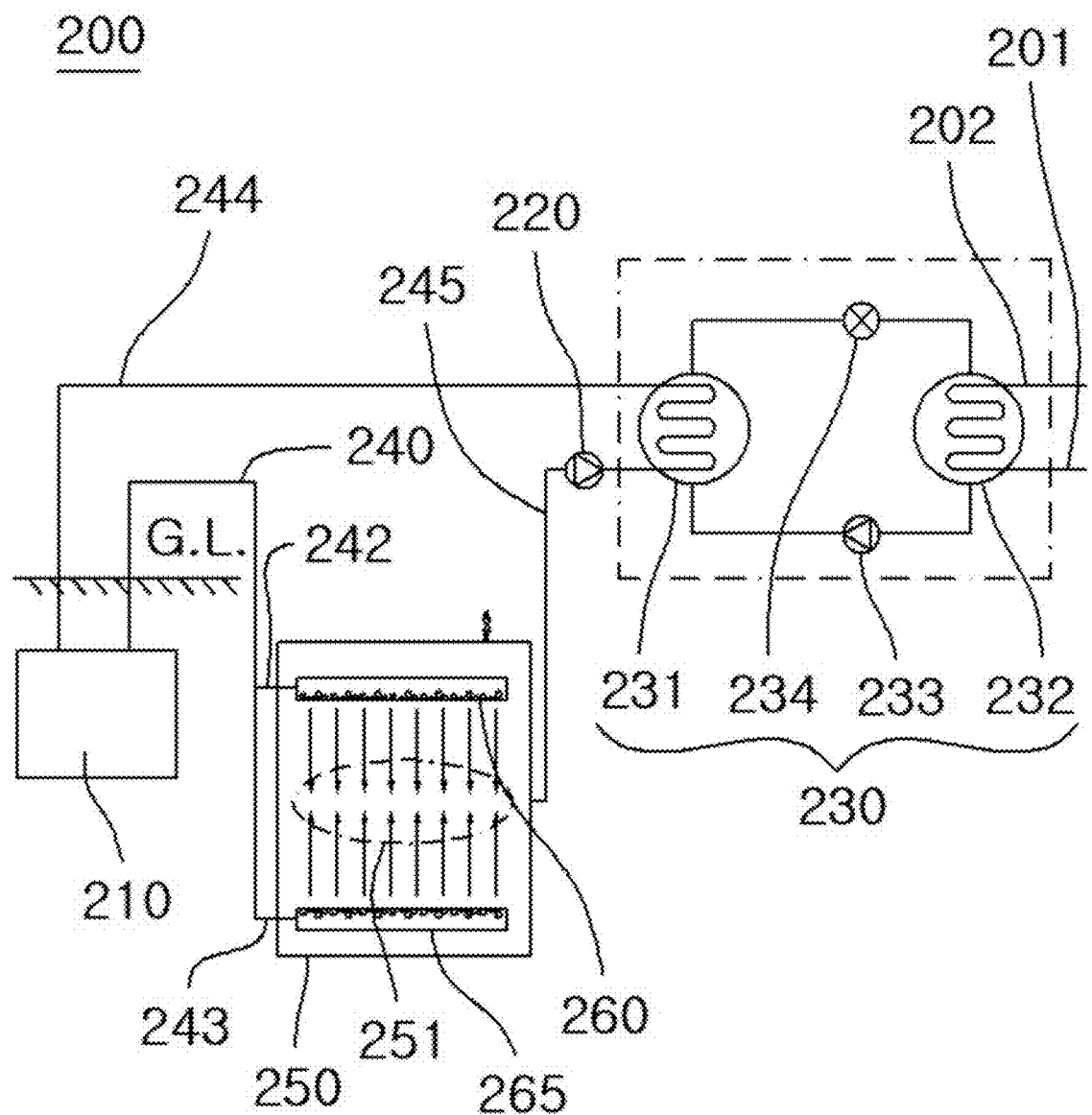
FIG. 4 is a schematic diagram illustrating the configuration of a geothermal heat system having reduced heat source residual heat of a geothermal heat pump according to a second embodiment of the present disclosure.

FIG. 4 is a schematic diagram illustrating the configuration of a geothermal heat system having reduced heat source residual heat of a geothermal heat pump according to a second embodiment of the present disclosure.

Referring to FIG. 4, in the present embodiment, a residual heat storage tank 250 is provided on a path connected in series, i.e., a geothermal heat supply pipe 240, through which a geothermal heat exchange medium flows from a ground heat exchanger unit 210 to a geothermal heat pump 230. Thus, a remaining portion of heat source residual heat, except for portions of the heat source residual heat moved to the underground through the ground heat exchanger unit 210, is stored in the residual heat storage tank 250.

In the present embodiment, a tank-direction first branch pipe 242 and a tank-direction second branch pipe 243 are branched from the geothermal heat supply pipe 240. Thus, the geothermal heat exchange medium having flowed through the geothermal heat supply pipe 240 is branched through the tank-direction first branch pipe 242 and the tank-direction second branch pipe 243, so that branched portions of the geothermal heat exchange medium are sprayed into the residual heat storage tank 250. Afterwards, the geothermal heat exchange medium flows through a tank heat connection pipe 245 connecting an outlet of the residual heat storage tank 250 and a heat source-side heat exchanger 231 of the geothermal heat pump 230 and then passes through the heat source-side heat exchanger 231.

An exit end of the heat source-side heat exchanger 231 is directly connected to a geothermal heat recovery pipe 244. Thus, the geothermal heat exchange medium having passed through heat source-side heat exchanger 231 flows through the geothermal heat recovery pipe 244 and then toward the ground heat exchanger unit 210.

Figure 5:
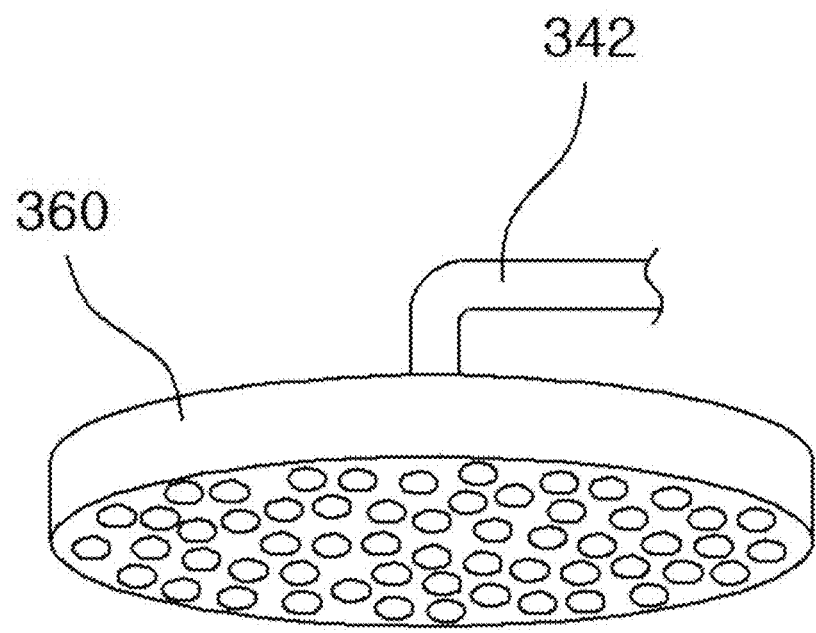
FIG. 5 is a perspective diagram illustrating a tank top spray nozzle of a geothermal heat system having reduced heat source residual heat of a geothermal heat pump according to a third embodiment of the present disclosure.

FIG. 5 is a perspective diagram illustrating a tank top spray nozzle of a geothermal heat system having reduced heat source residual heat of a geothermal heat pump according to a third embodiment of the present disclosure.

Referring to FIG. 5, in the present embodiment, a tank top spray nozzle 360 is provided in the shape of a disk, with a plurality of nozzle holes being provided in the bottom portion.

Although not shown, a tank bottom spray nozzle is also provided in the shape of a disk like the tank top spray nozzle 360, and has a plurality of nozzle holes provided in the top portion.

Figure 6:
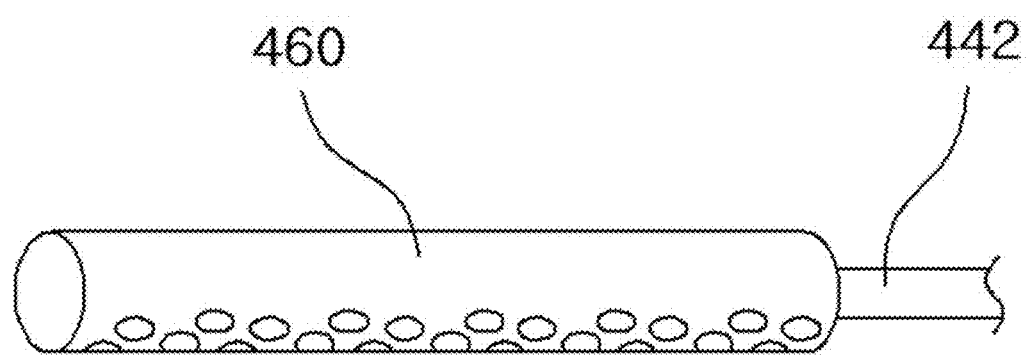
FIG. 6 a perspective diagram illustrating a tank top spray nozzle of a geothermal heat system having reduced heat source residual heat of a geothermal heat pump according to a fourth embodiment of the present disclosure.

FIG. 6 a perspective diagram illustrating a tank top spray nozzle of a geothermal heat system having reduced heat source residual heat of a geothermal heat pump according to a fourth embodiment of the present disclosure.

Referring to FIG. 6, in the present embodiment, a tank top spray nozzle 460 is provided in the shape of a rod having a predetermined length, with a plurality of nozzle holes being provided in the bottom portion.

Although not shown, a tank bottom spray nozzle is also provided in the shape of a rod having a predetermined length like the tank top spray nozzle 460, and has a plurality of nozzle holes provided in the top portion.

Figure 7:
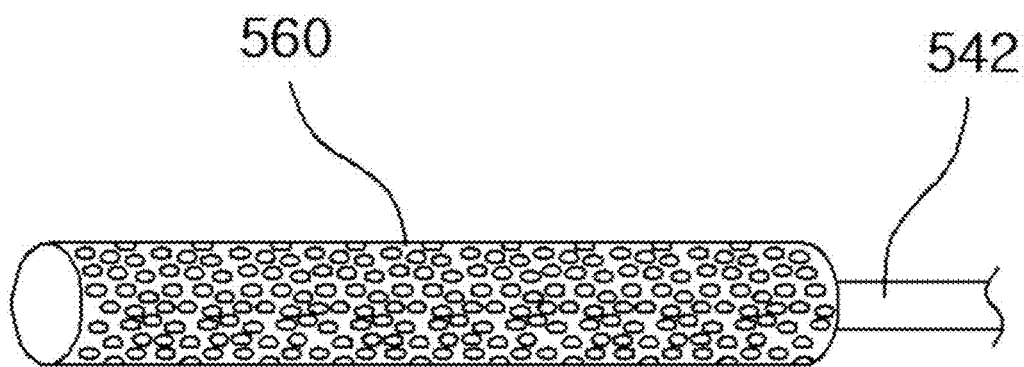
FIG. 7 a perspective diagram illustrating a tank top spray nozzle of a geothermal heat system having reduced heat source residual heat of a geothermal heat pump according to a fifth embodiment of the present disclosure.

FIG. 7 a perspective diagram illustrating a tank top spray nozzle of a geothermal heat system having reduced heat source residual heat of a geothermal heat pump according to a fifth embodiment of the present disclosure.

Referring to FIG. 7, in the present embodiment, a tank top spray nozzle 560 is provided in the shape of a rod having a predetermined length, with a plurality of minute holes being provided in all directions.

The minute holes are provided in the tank top spray nozzle 560 in all directions, thereby allowing a geothermal heat exchange medium to be sprayed from the tank top spray nozzle 560 in all directions. Consequently, evaporation of the geothermal heat exchange medium may be induced, thereby further improving heat exchange efficiency.

Although not shown, a tank bottom spray nozzle is also provided in the shape of a rod having a predetermined length like the tank top spray nozzle 560, and has a plurality of nozzle holes provided in all directions.

Figure 8:
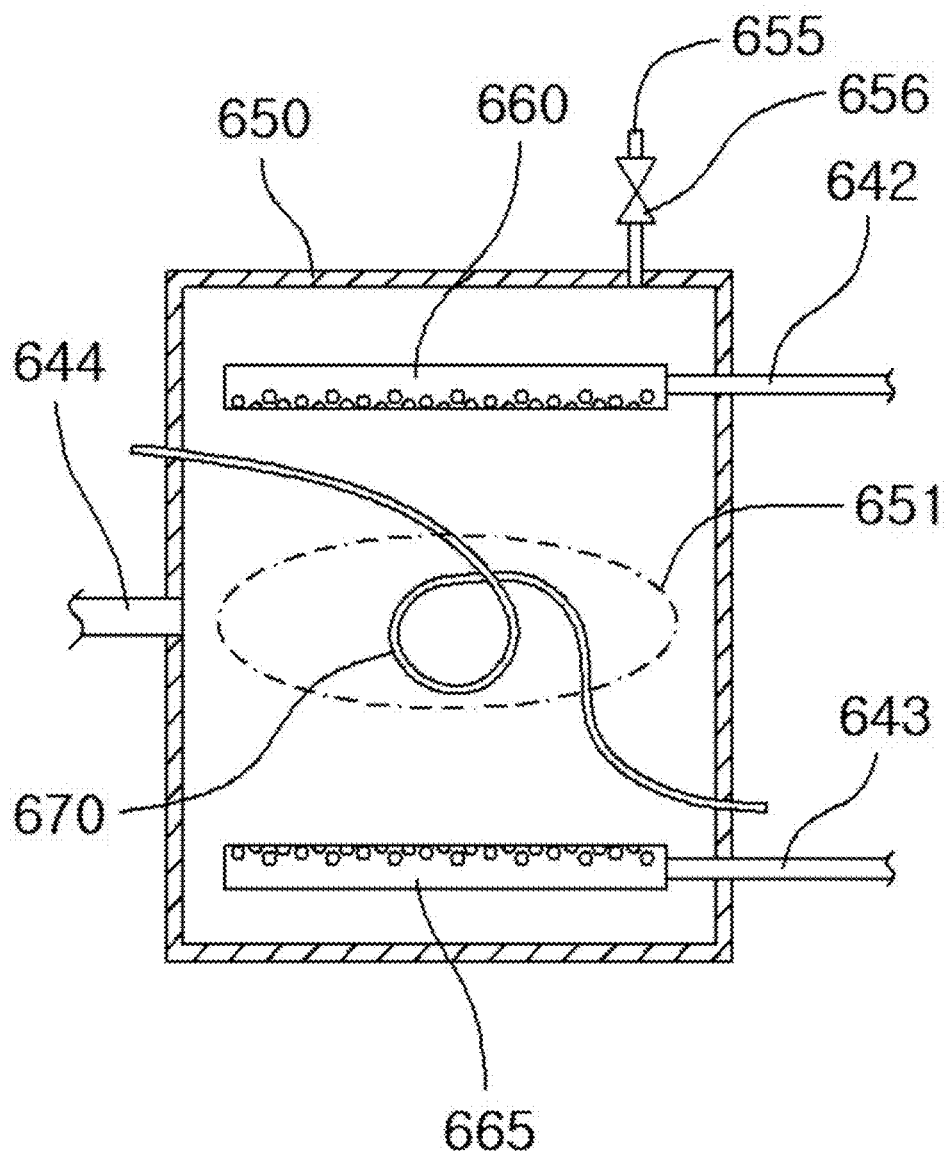
FIG. 8 is a vertical cross-sectional diagram illustrating the internal configuration of a residual heat storage tank of a geothermal heat system having reduced heat source residual heat of a geothermal heat pump according to a sixth embodiment of the present disclosure.

FIG. 8 is a vertical cross-sectional diagram illustrating the internal configuration of a residual heat storage tank of a geothermal heat system having reduced heat source residual heat of a geothermal heat pump according to a sixth embodiment of the present disclosure.

Referring to FIG. 8, a geothermal heat system having reduced heat source residual heat of a geothermal heat pump according to the present embodiment further includes a heat exchange coil 670.

The heat exchange coil 670 extends through at least one of an external heat source and an evaporator of a geothermal heat pump and through the central portion of a residual heat storage tank 650, in which portions of a geothermal heat exchange medium collide with each other, such that the energy of the temperature difference between the geothermal heat exchange medium and at least one of the external heat source and a condensation of the evaporator of the geothermal heat pump may be used as a heat source for cooling/heating of a location of use.

Here, the external heat source refers to a heat source, such as stream water, waste water, rainwater, or drinking water.

The heat exchange coil 670 may be wound at least once in a collision zone 651 of the central portion of the residual heat storage tank 650 so as to improve heat exchange efficiency.

In a situation in which the heat exchange coil 670 extends through the geothermal heat pump, a load-side heat exchanger serves as an evaporator when cooling is provided to the location of use, and a heat source-side heat exchanger serves as an evaporator when heating is provided to the location of use. Thus, the heat exchange coil 670 may be disposed to selectively extend through one of the load-side heat exchanger and the heat source-side heat exchanger that serves as an evaporator.

Figure 9:
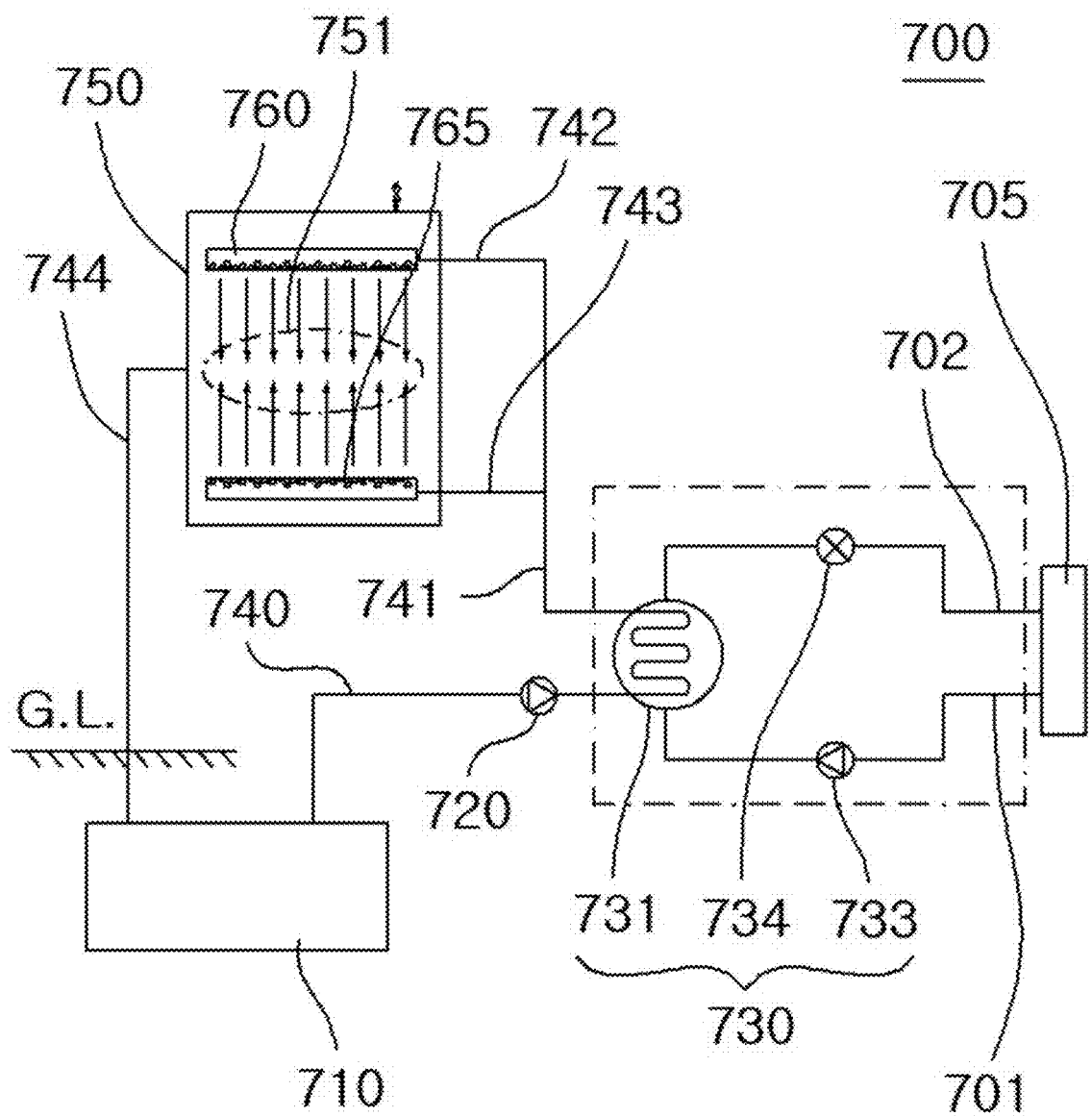
FIG. 9 is a schematic diagram illustrating the configuration of a geothermal heat system having reduced heat source residual heat of a geothermal heat pump according to a seventh embodiment of the present disclosure.

FIG. 9 is a schematic diagram illustrating the configuration of a geothermal heat system having reduced heat source residual heat of a geothermal heat pump according to a seventh embodiment of the present disclosure.

Referring to FIG. 9, a geothermal heat system 700 having reduced heat source residual heat of a geothermal heat pump 700 according to the present embodiment is substantially the same as the above-described geothermal heat system 100 having reduced heat source residual heat of a geothermal heat pump according to the first embodiment, except that the load-side heat exchanger is removed from a geothermal heat pump 730, and a use-side heat exchanger 705 is disposed on distal ends of use-side circulation pipes 701 and 702 extending from the geothermal heat pump 730 toward a location of use. Thus, a coolant flowing inside the geothermal heat pump 730 may circulate while flowing to the use-side heat exchanger 705 so as to directly exchange heat with air in the location of use through the use-side heat exchanger 705.

Figure 10:
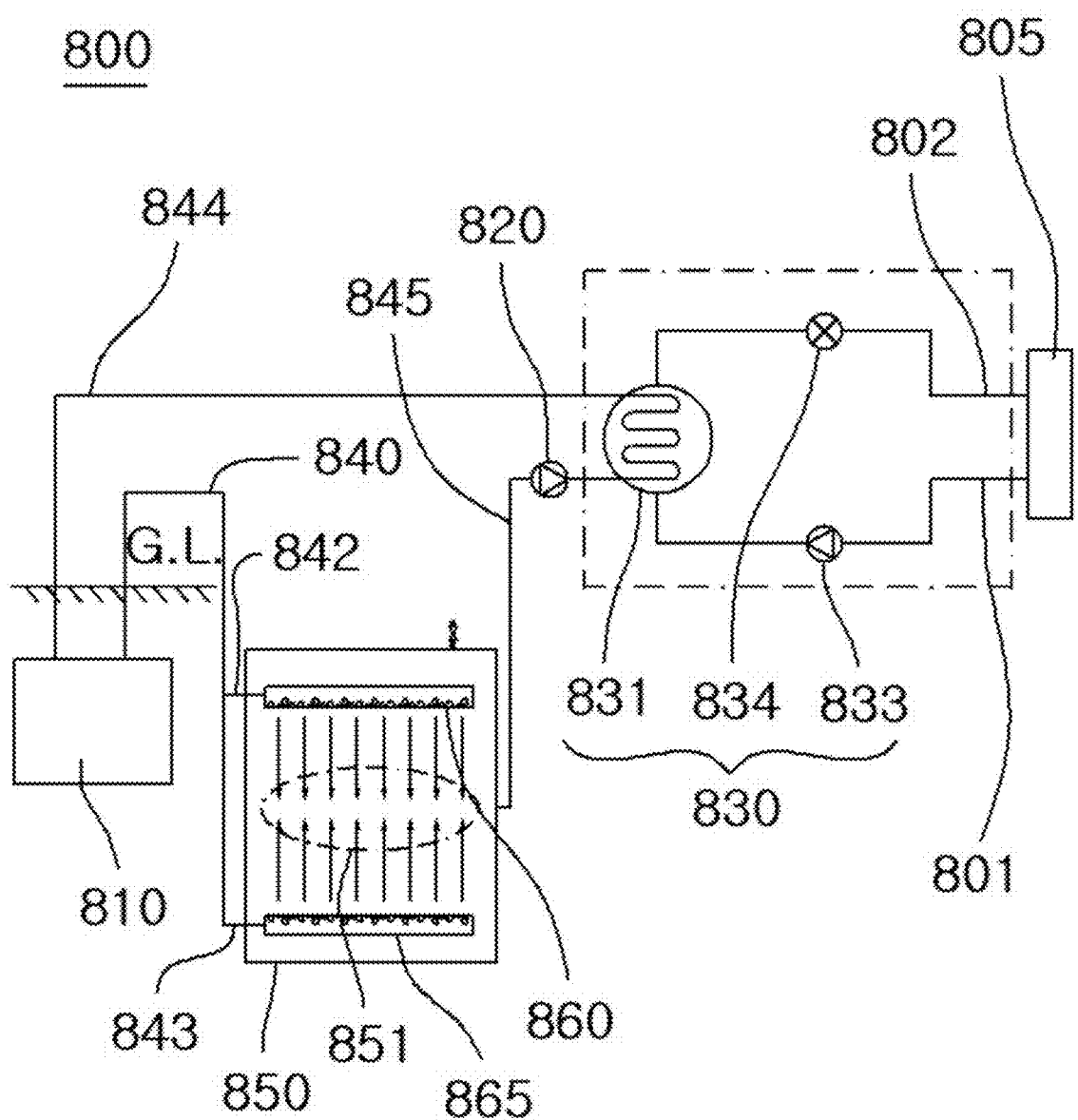
FIG. 10 is a schematic diagram illustrating the configuration of a geothermal heat system having reduced heat source residual heat of a geothermal heat pump according to an eighth embodiment of the present disclosure.

FIG. 10 is a schematic diagram illustrating the configuration of a geothermal heat system having reduced heat source residual heat of a geothermal heat pump according to an eighth embodiment of the present disclosure.

Referring to FIG. 10, a geothermal heat system 800 having reduced heat source residual heat of a geothermal heat pump according to the present embodiment is substantially the same as the above-described geothermal heat system 200 having reduced heat source residual heat of a geothermal heat pump according to the second embodiment, except that the load-side heat exchanger is removed from a geothermal heat pump 830, and a use-side heat exchanger 805 is disposed on distal ends of use-side circulation pipes 801 and 802 extending from a geothermal heat pump 830 toward a location of use. Thus, a coolant flowing inside the geothermal heat pump 830 may circulate by flowing to the use-side heat exchanger 805 so as to directly exchange heat with air in the location of use through the use-side heat exchanger 805.

Although the specific exemplary embodiments of the present disclosure have been illustrated and described, it will be apparent to those having ordinary skill in the art that many modifications and variations are possible without departing from spirits and scopes of the present disclosure defined by appended claims. It is definitely noted that such modifications and variations are included within the scope of the present disclosure.

INDUSTRIAL APPLICABILITY

In the geothermal heat system having reduced heat source residual heat of a geothermal heat pump according to an aspect of the present disclosure, at least a portion of heat source residual heat produced during provision of cooling/heating to the location of use by the geothermal heat pump can be processed, thereby improving the operating efficiency. Therefore, the present disclosure is regarded as having high industrial applicability.

What is claimed is:

1. A geothermal heat system having reduced heat source residual heat of a geothermal heat pump, the geothermal heat system comprising:
a ground heat exchanger unit allowing a geothermal heat exchange medium to exchange heat with the underground;
the geothermal heat pump allowing the geothermal heat exchange medium, which has exchanged heat with the underground while passing through the ground heat exchanger unit, to exchange heat with a coolant while passing through the geothermal heat pump so as to provide cooling/heating to a location of use;
a residual heat storage tank connected to a path connected in series, through which the geothermal heat exchange medium flows from the geothermal heat pump to the ground heat exchanger unit, to store a portion of heat source residual heat therein, thereby reducing an operating load of at least one of the underground and the geothermal heat pump, wherein the heat source residual heat includes warm residual heat produced as the geothermal heat pump provides cooling to the location of use and remaining inside the geothermal heat pump and in the geothermal heat exchange medium and cold residual heat produced as the geothermal heat pump provides heating to the location of use and remaining inside the geothermal heat pump and in the geothermal heat exchange medium; and
a geothermal heat source pump moving the geothermal heat exchange medium from the ground heat exchanger unit toward the geothermal heat pump,
wherein, even when the temperature of the location of use reaches a set temperature or a target temperature during cooling/heating of the location of use and thus the geothermal heat pump is stopped, the geothermal heat source pump continues running so that a portion of the heat source residual heat remaining in the geothermal heat pump is transferred on the geothermal heat exchange medium passing through the geothermal heat pump so as to be stored in the residual heat storage tank, and as an internal temperature of the residual heat storage tank gradually becomes the same as the temperature of the underground, a thermal load of the underground is removed, and thus, when the geothermal heat pump is restarted, the operating load of the geothermal heat pump is reduced.

2. The geothermal heat system according to claim 1, further comprising a geothermal heat source pump moving the geothermal heat exchange medium from the ground heat exchanger unit toward the geothermal heat pump,
wherein, before the geothermal heat pump is started to provide cooling/heating to the location of use, the geothermal heat source pump is started so that the geothermal heat exchange medium circulates through the ground heat exchanger unit and the residual heat storage tank, thereby causing an internal temperature of the residual heat storage tank to be substantially the same as the temperature of the underground, and thus, when the geothermal heat pump is started to provide cooling/heating to the location of use, the operating load of the geothermal heat pump is reduced.

3. The geothermal heat system according to claim 1, further comprising a use-side heat exchanger disposed on distal ends of use-side circulation pipes extending from the geothermal heat pump toward the location of use, such that the coolant flowing inside the geothermal heat pump circulates while flowing to the use-side heat exchanger so as to directly exchange heat with air in the location of use through the use-side heat exchanger.

4. A geothermal heat system having reduced heat source residual heat of a geothermal heat pump, the geothermal heat system comprising:
a ground heat exchanger unit allowing a geothermal heat exchange medium to exchange heat with the underground;
the geothermal heat pump allowing the geothermal heat exchange medium, which has exchanged heat with the underground while passing through the ground heat exchanger unit, to exchange heat with a coolant while passing through the geothermal heat pump so as to provide cooling/heating to a location of use; and
a residual heat storage tank storing a portion of heat source residual heat to reduce an operating load of at least one of the underground and the geothermal heat pump, wherein the heat source residual heat includes warm residual heat produced as the geothermal heat pump provides cooling to the location of use and remaining inside the geothermal heat pump and in the geothermal heat exchange medium and cold residual heat produced as the geothermal heat pump provides heating to the location of use and remaining inside the geothermal heat pump and in the geothermal heat exchange medium,
wherein portions of the geothermal heat exchange medium are sprayed as counterflows from an inner upper portion and an inner lower portion of the residual heat storage tank toward a central portion of the residual heat storage tank to collide with each other in the central portion of the residual heat storage tank, and then, the geothermal heat exchange medium is discharged through an outlet provided in the central portion of the residual heat storage tank to move toward the underground, so that an amount of heat exchange in the residual heat storage tank is increased.

5. The geothermal heat system according to claim 4, further comprising:
a tank-direction main pipe allowing the geothermal heat exchange medium, which has passed through the geothermal heat pump, to flow toward the residual heat storage tank;
a tank-direction first branch pipe branched from the tank-direction main pipe and connected to an upper portion of the residual heat storage tank;
a tank-direction second branch pipe branched from the tank-direction main pipe and connected to a lower portion of the residual heat storage tank;
a tank top spray nozzle disposed in the inner upper portion of the residual heat storage tank and communicating with the tank-direction first branch pipe to spray a portion of the geothermal heat exchange medium, which has flowed through the tank-direction first branch pipe, from the inner upper portion of the residual heat storage tank toward the central portion of the residual heat storage tank; and
a tank bottom spray nozzle disposed in the inner lower portion of the residual heat storage tank and communicating with the tank-direction second branch pipe to spray a portion of the geothermal heat exchange medium, which has flowed through the tank-direction second branch pipe, from the inner lower portion of the residual heat storage tank toward the central portion of the residual heat storage tank,
wherein the portions of the geothermal heat exchange medium sprayed through the tank top spray nozzle and the tank bottom spray nozzle, respectively, collide with each other in the central portion of the residual heat storage tank.

6. The geothermal heat system according to claim 5, wherein at least one of the tank top spray nozzle and the tank bottom spray nozzle has at least one shape among a spring, a disk, and a rod.

7. The geothermal heat system according to claim 5, wherein at least one of the tank top spray nozzle and the tank bottom spray nozzle comprises a plurality of minute holes,
wherein the minute holes are provided in at least one of the tank top spray nozzle and the tank bottom spray nozzle in all directions to allow the geothermal heat exchange medium to be sprayed from at least one of the tank top spray nozzle and the tank bottom spray nozzle in all directions.

8. The geothermal heat system according to claim 4, wherein the residual heat storage tank is connected to a path connected in series, through which the geothermal heat exchange medium flows from the ground heat exchanger unit to the geothermal heat pump, to store therein a remaining portion of heat source residual heat, except for portions of the heat source residual heat moved to the underground through the ground heat exchanger unit.

9. The geothermal heat system according to claim 4, further comprising a breather valve provided on the upper portion of the residual heat storage tank and configured to automatically discharge gas vapor through the upper portion of the residual heat storage tank, wherein the gas vapor is produced as the portions of the geothermal heat exchange medium sprayed as counterflows from the inner upper portion and inner lower portion of the residual heat storage tank toward the central portion of the residual heat storage tank collide with each other in the central portion of the residual heat storage tank.

10. The geothermal heat system according to claim 4, further comprising a heat exchange coil extending through at least one of an external heat source and an evaporator of the geothermal heat pump and through the central portion of the residual heat storage tank, in which the portions of the geothermal heat exchange medium collide with each other, such that the energy of the temperature difference between the geothermal heat exchange medium and at least one of the external heat source and a condensation of the evaporator of the geothermal heat pump may be used as a heat source for cooling/heating of the location of use.

11. The geothermal heat system according to claim 4, further comprising a use-side heat exchanger disposed on distal ends of use-side circulation pipes extending from the geothermal heat pump toward the location of use, such that the coolant flowing inside the geothermal heat pump circulates while flowing to the use-side heat exchanger so as to directly exchange heat with air in the location of use through the use-side heat exchanger.

* * * * *